[11] 3,597,525

[72] Inventor Adam Kozma
London, England
[21] Appl. No. 622,252
[22] Filed Mar. 10, 1967
[45] Patented Aug. 3, 1971
[73] Assignee The Battelle Developments Corporation,
Columbus, Ohio

[54] BIAS LEVEL REDUCTION OF INCOHERENT HOLOGRAMS
12 Claims, 8 Drawing Figs.

[52] U.S. Cl .................................................. 178/6.5;
350/3.5
[51] Int. Cl. ............................................. H04n 9/54
[50] Field of Search ................................. 350/3.5,
178/6.5

[56] References Cited
UNITED STATES PATENTS
3,444,316 5/69 Gerritsen .................... 178/6.5

OTHER REFERENCES

Stetson Powell, Interferometric Vibration Analysis by Wavefront Reconstruction, Jour. of Optical Society of Amer. (I), Vol. 55, No. 12, Dec. 1965, Pp. 1593-1598.

Optical Society of Amer. (II), Fiftieth Anniversary Meeting Program, Mar 15-18, 1966, p. 7, paper WB18, Bias Level Reduction of Incoherent Holograms, Kozma and Massey.

Holography The Picture Looks Good, Blum, Electronics, Apr. 18, 1966, Vol 39, No 8, pp. 139-143.

Primary Examiner — Robert L. Griffin
Assistant Examiner — Joseph A. Orsino, Jr.
Attorneys — Woodcock, Washburn, Kurtz & Maskiewicz ABSTRACT: Methods and apparatus for reducing the bias level that is present in holograms made with spatially incoherent light by temporarily phase-modulating the light in one path of an interferometer.

PRIMARY ENERGY (ev) OR PHOTOCATHODE TO TARGET POTENTIAL (VOLTS)

BACKGROUND OF THE INVENTION

This invention relates to methods and apparatus for using incoherent radiant energy in the production of holograms. More specifically, it relates to methods and apparatus for reducing the bias level that is present in holograms made with incoherent radiant energy such as spatially incoherent light. By this invention, holograms of good quality (low bias level) can be made using ordinary spatially incoherent light as the source for illuminating the object scene.

Holograms of the Gabor type and holograms made by off-axis holographic techniques are normally produced with coherent radiation or radiant energy. Off-axis holographic techniques using coherent radiation are described in U.S. patent application Serial No. 361,977 filed Apr. 23, 1964, now U.S. Patent No. 3,506,327 and in U.S. Patent application Serial No. 503,993 filed Oct. 23, 1965. The holography or wavefront reconstruction process described in these applications includes directing a first beam of coherent light onto an object and positioning a detector, usually a photographic plate, to receive the light emanating from the object. A second beam of light coherent with respect to the first beam is directed at a selected angle to the light from the object and onto the detector, causing the light from the object and the light from the second beam, normally referred to as a reference beam, to form a pattern of intereference fringes on the detector. This pattern of interference fringes, sometimes called an off-axis hologram, is then used in a reconstruction process to produce a truly three-dimensional real or virtual image of the original object. Reconstruction of an image of the original object is produced by illuminating the hologram with coherent light where the illuminating beam is positioned at an angle similar to that in which the reference beam was positioned in the construction process. In such method, the light source used to illuminate the object beam and that used as reference beam was coherent radiation. Similarly, in the reconstruction process, the illuminating beam was coherent radiation.

The possibility of making holograms of objects illuminated with spatially incoherent light has been proposed previously by others. It had been recognized that coherence was not necessary and it was only essential that each object point generate its own Fresnel zone plate pattern on the hologram. Each Fresnel zone plate acts as a lens in the reconstruction process and thus produces an image. For example, on one prior art arrangement, holograms were produced by shadowing a number of point sources through a Fresnel zone plate mask onto photographic film. Another proposal involved the use of a triangular interferometer of the cyclical type for producing holograms of point objects illuminated with the green line of a high pressure Hg vapor lamp. Various other proposals for producing spatially incoherent holograms have been reported in the literature. In most of the proposed systems the hologram is made by dividing the light coming from each object point into two parts using an interferometer. In each path of the interferometer, the light is spatially dispersed so that upon recombination, each object point reproduces an intensity pattern which is the sum of a uniform bias level and a spatially modulated pattern. Since the object is incoherently illuminated, the resulting hologram, at least to a first approximation, is the record of the superposition of many such intensity patterns. The incoherent hologram, when illuminated with a collimated coherent beam of light will form an image of the object in a manner analogous to coherent holography. In these prior methods, the ratio of the bias to the spatially fluctuating intensity builds up rapidly as the number of points in the object scene is increased. Thus, for complicated scenes, such as those with continuous tones or three-dimensional features, these prior methods give poor images because of the large relative bias level in the hologram causes the spatial fluctuations, necessary for reconstruction, to be lost in the detector noise.

SUMMARY OF THE INVENTION

It is an object of the present invention to reduce or eliminate the bias prior to recording the hologram. In accordance with the present invention, this is accomplished by temporally phase-modulating the light in one path of an interferometer. By doing so, the resulting intensity at the hologram plane will contain a spatially modulated part which is also modulated at this time frequency while the bias part is unmodulated. Thus, the bias and the spatially modulated part can be distinguished by performing a point-by-point time correlation over the hologram plane. The temporal phase modulation of the light may be, for example, produced by using a vibrating mirror in one leg of a modified Linnik interferometer at some selected frequency much lower than the frequency of light. Another method of phase modulating the light includes the use of a polarizing element in one leg of a cyclic interferometer. It is a further object of the invention to provide a system for detecting a hologram produced by the above-mentioned methods.

For further objects and advantages of the invention and for a more detailed explanation thereof, reference is to be had to the following description taken in conjunction with the accompanying drawings.

BRIEF DESCRIPTION OF THE DRAWINGS

FIG. 7 is a diagrammatic view of a system for producing spatially incoherent holograms by using a polarizing element for temporal phase-modulation of the light.

DESCRIPTION OF PREFERRED EMBODIMENTS

Figure 1:
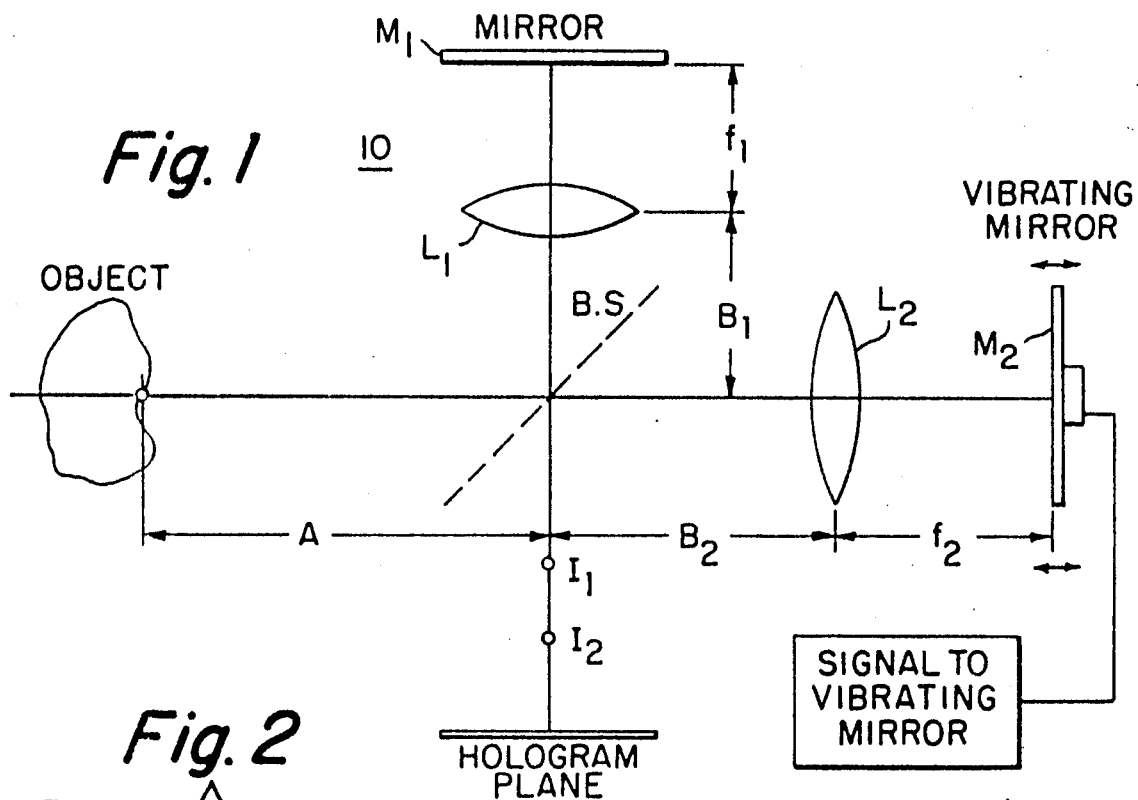
FIG. 1 is a diagrammatic view of a system for producing holograms with spatially incoherent light using an interferometer in which a vibrating mirror is placed in one leg of the interferometer.

Referring to FIG. 1 there is illustrated a system utilizing an interferometer for producing incoherent holograms. The object is illuminated by a source of spatially incoherent light not shown in the diagram. Light from each point on the object is split by a beam splitter B.S. in the interferometer 10 into two paths. The light traversing one path travels a distance of $B_1$ to a lens $L_1$ with a focal length $f_1$. A mirror $M_1$ is placed at the focal length $f_1$ and light is reflected from the mirror $M_1$ back through the lens $L_1$ to form an image of the object at $I_1$. Similarly, light passing through the beam splitter B.S. traverses a second path traveling a distance $B_2$ to a second lens $L_2$ with a focal length $f_2$. The light is reflected from a mirror $M_2$ placed at the focal length $f_2$ of the lens $L_2$, the light returning through the lens $L_2$ and being reflected by the B.S. to form an image of the object point at $I_2$. The two optical paths, B.S. to $M_1$, $M_1$ to the hologram plane and B.S. to $M_2$, $M_2$ to the hologram plane are set equal so that spatially incoherent light of a finite spectial range can be used.

This system 10 has advantages over a triangular interferometer because of the ease of producing an offset frequency, the fact that this offset frequency is a constant for all zone plates, the fact that the zone plates are distributed over the hologram in the same way that the object points are distributed over the object and because the two paths are separate. It will be noted from FIG. 1 that this system or instrument, which can be called a modified Linnik interferometer, has a different focal length lens $L_1$ and $L_2$ in each path. The mirrors $M_1$ and $M_2$ are placed at the back focal plane of the lenses $L_1$ and $L_2$ so that each leg acts as a unit power telescope. When an object is placed at the position shown in FIG. 1, the two axially displaced images will be formed at $I_1$ and $I_2$. Each of these images is an accurate three-dimensional representation of the object because of the imaging properties of the unit power telescopes. The hologram is produced at a plane which is axially displaced from the images at $I_1$ and $I_2$. Since the object is incoherently illuminated there will only be mutual coherence between an image point and its axially displaced pair. These two points will produce mutually coherent spherical waves of different curvature at the hologram plane; consequently, the interference pattern will be a Fresnel zone plate whose focal length F for collimated light illumination is given by the expression $$F = \frac{F_1 F_2}{(F_1 - F_2)}$$

where $F_1$ and $F_2$ are the distances of $I_1$ and $I_2$, respectively, from the hologram. For each point on the object, an interference pattern in the form of a Fresnel zone plate will be produced. The hologram will then consist of a superposition of zone plates, each one corresponding to a point on the object. The contrast of the intensity of the zone plate is maximum at the center and it decreases as the zones become smaller in a manner predictable of a knowledge of the spectrum of the light. The center of these zone plates will be aligned with the centers of the object points producing them; consequently, if the object consists of uniformly distributed points, the zone plates will be uniformly distributed over the hologram. An offset frequency can be introduced into the hologram placing half-plane stops at each of the mirrors. These stops remove the portion of the light which forms one-half of the zone plate. Since the mirror is at the back focus of the lens, all of the zone plates are treated in the same way. The offset frequency is necessary so that upon reconstruction the usual conjugate image of holography can be removed by spatial filtering and the undeviated or bias light can be removed in the same manner.

In utilizing a system of the type shown in FIG. 1 the object, in the form of transparent lettering, was illuminated with a laser light diffused by a rotating ground glass. This was convenient, since the optical path through the two legs need not be exactly equal. The effect of light sources of shorter coherence length can be simulated, however, quite easily. This is done by replacing the half-plane stops with small apertures. The effect of these apertures is to limit the number of zones of the zone plates in much the same way that they would be limited by the coherence length of a broad band light source. The decrease in contrast with increasing radius of the Fresnel zone plate due to the finite spectral width of the light source can also be simulated by placing weighting transparencies at the mirrors.

The principal problem which exists in incoherent holography is the rapid build-up of the ratio of the bias to the spatially fluctuating intensity as the number of points in the object is increased. In the coherent case, where one has independent control of the bias, the ratio of the reconstruction to film grain noise intensity depends essentially only on the type of film. In the incoherent case, the ratio of the bias to spatially fluctuating intensity is controlled by the number of zone plates which overlap on the hologram. Hence, for a given film, the brightness of the reconstruction is governed by two factors, one is the number, or more correctly, the density of resolvable points in the object and the second is the coherence length of the light source. The density of the points influences the brightness since the denser the points, the more overlapping zone plates there are. The coherence length influences the brightness because the size of the zone plate and, consequently, its influence area goes up with the coherence length.

It is the object of the present invention to eliminate this problem by eliminating or reducing the bias prior to recording the hologram on film. This can be done by phase-modulating, as a function of time, the light in one path of the interferometer 10. If this is done, the resulting intensity at the hologram plane will contain a spatially modulated part which is also modulated at this time frequency while the bias part is unmodulated. It is then possible to distinguish between the bias and the spatially modulated part by performing a point-by-point time correlation over the hologram plane.

This technique can be implemented on the modified Linnik interferometer 10 of FIG. 1 by sinusoidally vibrating or oscillating one of the mirrors $M_1$ or $M_2$. As illustrated in FIG. 1, the mirror $M_2$ is adapted to be vibrated. It will be assumed that the mirror $M_2$ is vibrated so that $u$ is the maximum phase fluctuation of the light and $p$ is the radian frequency of the vibration, and $p$ is very much less than the radian frequency of vibration of light of the illuminating source.

If it is assumed for simplicity that the light source is spatially incoherent but monochromatic and plane polarized, the intensity at the hologram plane due to the $i$th object point is given by $$I(x, y, t) = \frac{1}{4} a_i^2 \left\{ 1 + J_0[u] \cos [\psi_{i1} - \psi_{i2}] \right.$$

$$+ 2 \cos [\psi_{i1} - \psi_{i2}] \sum_{k=1}^{\infty} (-1)^k J_{2k}(u) \cos 2kpt$$

$$\left. - 2 \sin [\psi_{i1} - \psi_{i2}] \sum_{k=0}^{\infty} (-1)^k J_{2k+1}(u) \cos (2k+1)pt \right\}$$

$$+ \text{HIGH FREQUENCY TERMS} \quad (1)$$

where $a_i^2$ is the intensity of the $i$th object point and $\Psi_{i1}$ and $\Psi_{i2}$ are respectively the spatial dispersion through paths one and two of the interferometer.

If the amplitude of the phase modulation is set so that the zero order Bessel function, in the second term, vanishes the result is that the bias term is constant with time while the spatially modulated terms have been modulated onto a narrow-band time carrier. If all of the object points are summed, ther will again arise the problem that the bias term is very much larger than the spatially fluctuating term. However, if attention is confined to a single point $(X_0, Y_0)$ in the hologram and a photocell is placed at this point, then since the bias term and the various spatial fluctuation terms are disjoint in time frequency, electrical filters may be used to distinguish between them by filtering the current produced by the photocell. For example, a narrow band filter matched to the mirror vibration frequency will only pass the first term of the second sum given by $$I(x_0, y_0, t) = \tfrac{1}{2} a_i^2 \sin [\psi_{i1} - \psi_{i2}] J_1(u) \cos pt \quad (2)$$

An important point is that the spatially fluctuating terms are on a narrow band time carrier and thus not only is it possible to discriminate against the bias term itself, but also against the photocell shot noise produced by this relatively large light intensity.

Figure 2:
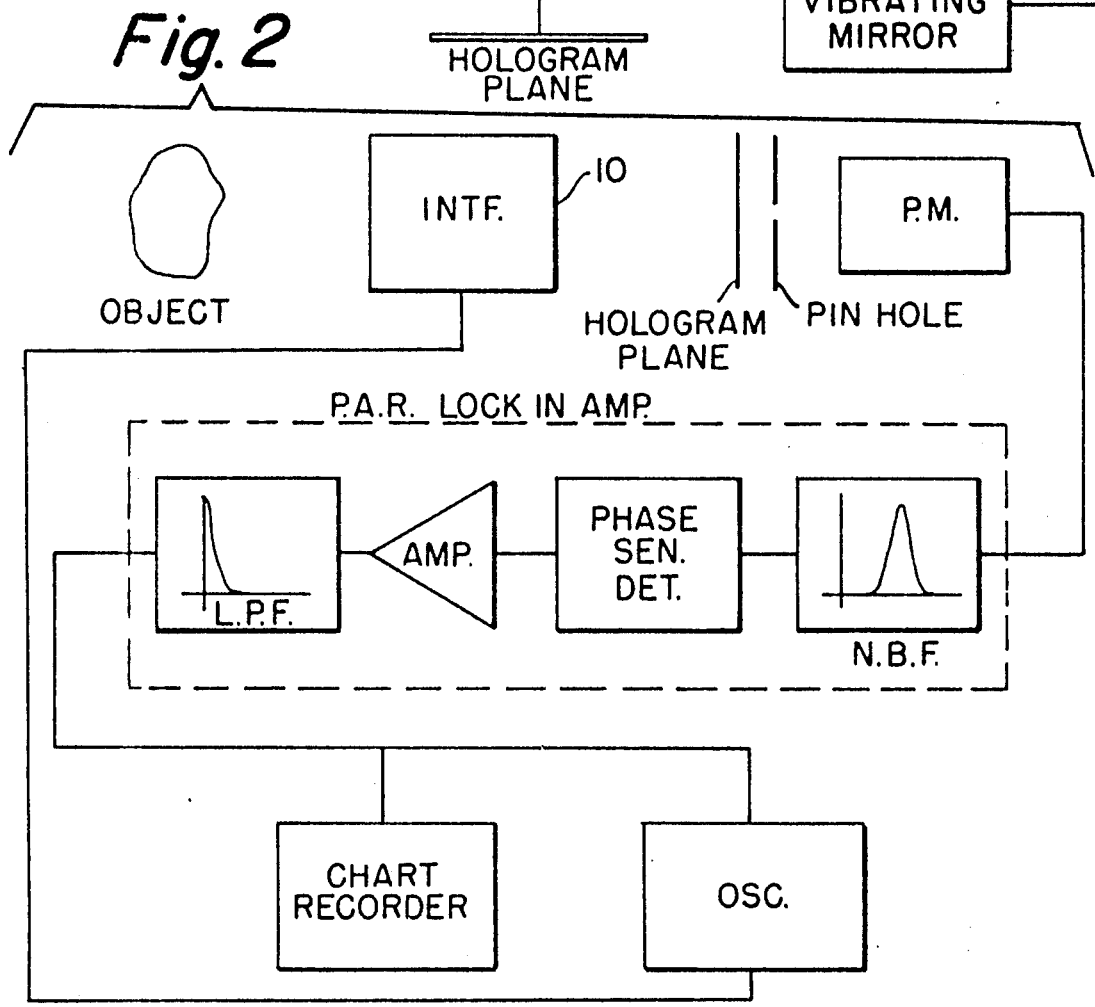
FIGS. 2 and 3 are diagrammatic views of systems for producing and detecting spatially incoherent holograms in accordance with the present invention.

This technique was verified by using the system shown in FIG. 2. The interferometer 10 used was the modified Linnik type shown in FIG. 1. The mirror was vibrated by coupling a varying magnetic field to one of the mirror holders as shown in relation to mirror $M_2$ in FIG. 1. An audio oscillator was used to both drive the magnetic field and as a reference signal for the detection system. A hologram of a point object was formed at the hologram plane. A pinhole and a photomultiplier were arranged on a motor driven slide so that the hologram plane could be scanned. The photomultiplier signal was passed, either through a chopper stabilized D.C. voltmeter or through a PAR lock-in amplifier schematically shown in FIG. 2 and the signal recorded.

The PAR lock-in amplifier is a correlation device which is more correctly described as a tuned amplifier followed by a balanced mixer where the phase-sensitive detection takes place. This output is then amplified by a narrow band low pass amplifier and fed to a driver which drives external recorders. This technique was successfully demonstrated using a point object with a mirror vibrating frequency of about 400 cycles per second. The record was obtained through the lock-in amplifier and the bias was eliminated along with a bias drift due to imperfect optical components.

Figure 3:
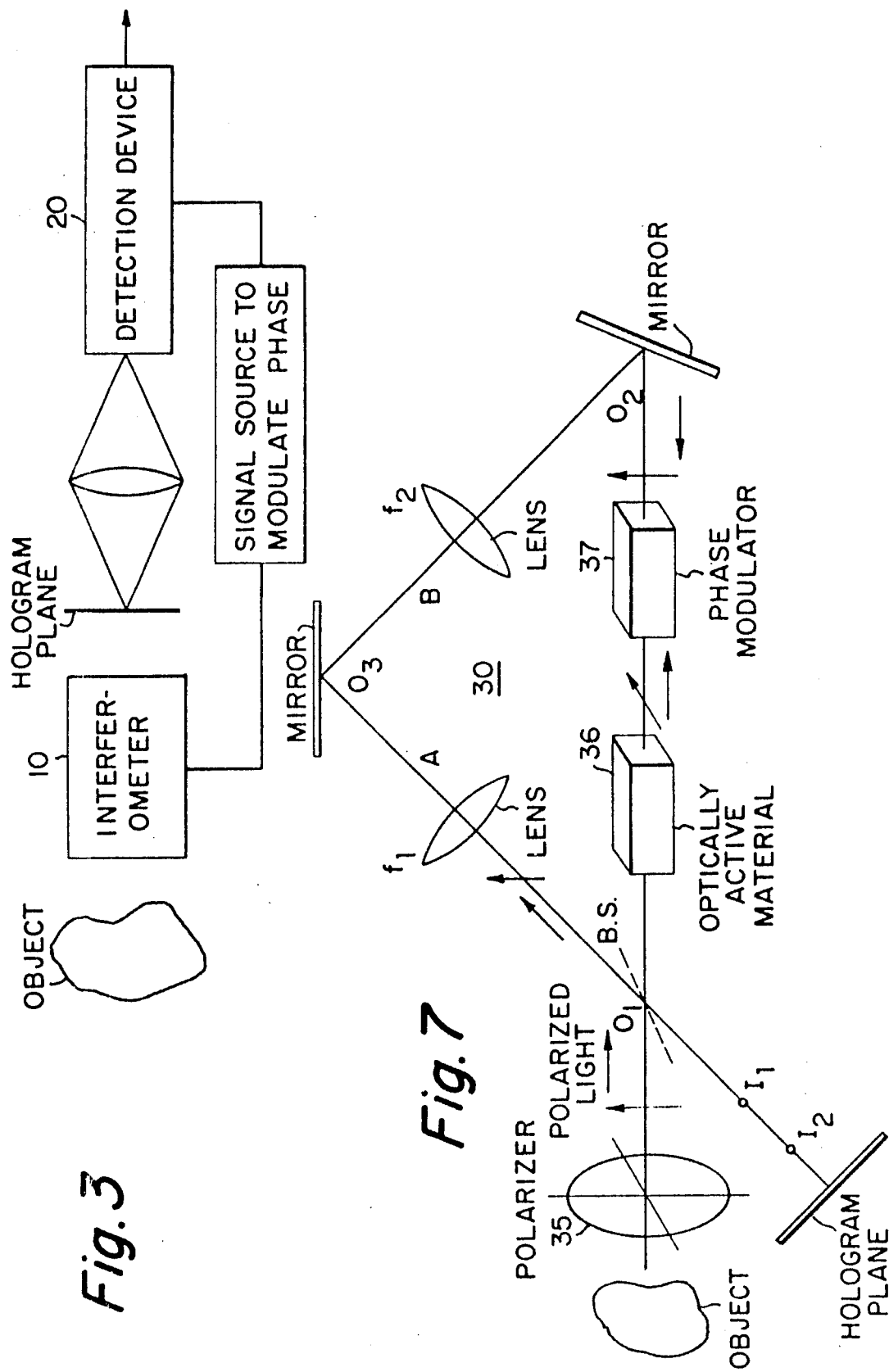

Referring to FIG. 3, there is illustrated in block diagram form an arrangement to detect the hologram after it is produced by the interferometer 10 of FIG. 1. The signal source which is used to phase-modulate the light in the interferometer 10 is also used by the detection device 20 in the scanning of the hologram plane. The detection device 20 in one form thereof may comprise a matrix of photocells, one for each resolution element, to cover the entire hologram plane. Each photocell would have a narrow band filter tuned to the mirror vibration frequency unless some time-sharing is allowed. A preferred method is to use a modified image orthicon tube to scan the hologram plane described in connection with FIGS. 4–6.

Figure 4:
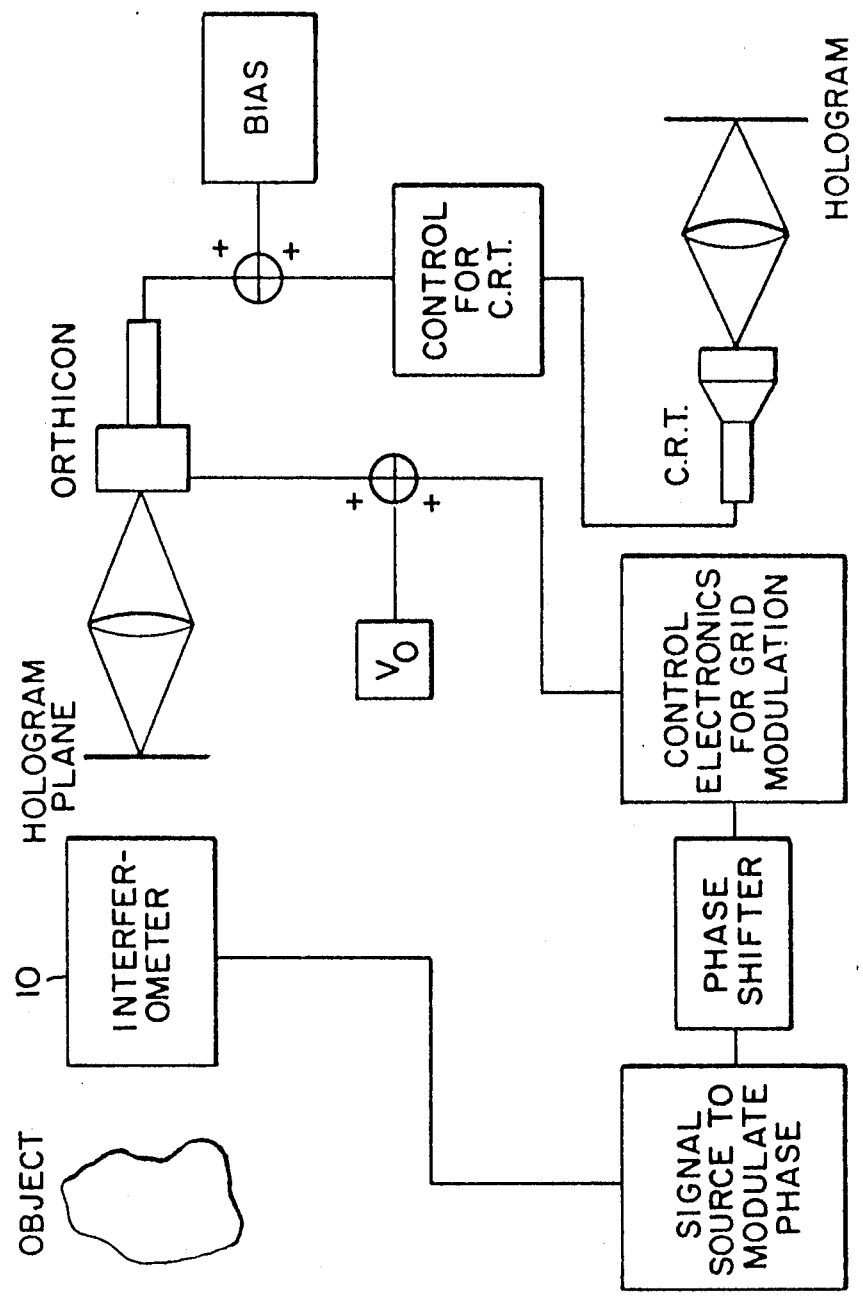
FIG. 4 is a diagrammatic view of a system for using a modified image-orthicon device to record the spatially incoherent hologram.

The system using the orthicon is shown schematically in FIG. 4. An interferometer, such as shown in FIG. 1, is used to form the spatially incoherent hologram at the hologram plane. One of the legs of the interferometer is phase-modulated, as described above, by a signal source. This signal source is also used to modulate the accelerating grid of the orthicon in such a way that the charge build-up at the orthicon target is proportional to the spatial modulation term from which the hologram can be reconstructed. The charge build-up $Q(x, y, T)$ at the orthicon target can be written as $$Q(x, y, T) = K \int_{t_0}^{T} I_i(x, y, t)[V_0 - k \cos pt - V_0] dt \quad (3)$$

where $I_i$ is given by Eq. (1) for the $i$th point. Then, if $J_0(u) = 0$, of the various terms in (1), only the term $$\sum_i (-\tfrac{1}{4} a_i^2 \sin[\psi_{i1} - \psi_{i2}].520 \cos pt)$$

has significant value after time $\gg 2\pi/p$ and $Q$ becomes for $N$ points in the object $$Q(x, y, T) = \frac{.520K}{2} \int_0^T \left\{ \sum_i k a_i^2 \sin[\psi_{i1} - \psi_{i2}] \cos^2 pt \, dt \right\}$$

$$= \frac{.520K}{2} \sum_i k \sin[\psi_{i1} - \psi_{i2}] \left\{ \int_0^T a_i^2 \cos^2 pt \, dt \right\} \quad (4)$$

This is, of course, the spatial modulation term with which the object can be reconstructed.

This charge distribution $Q$ can then be scanned off by the electron gun of the orthicon and turned into a bipolar electrical signal. After adding a suitable bias to this signal, the pattern can be recorded, by use of a cathode ray tube, CRT, on film as a hologram. This hologram, in turn, can then be used to reconstruct the original object by using the proper coherent light illumination.

The technique for recording incoherent holograms using an image orthicon makes use of the fact that a typical image orthicon target can be operated with an accelerating potential which leads to a target primary electron to secondary-emission ratio of unity. This fact and the fact that the orthicon can store a two-dimensional charge image on the target makes this device suitable for use in eliminating the large bias level which is present in incoherent holography.

Figure 5:
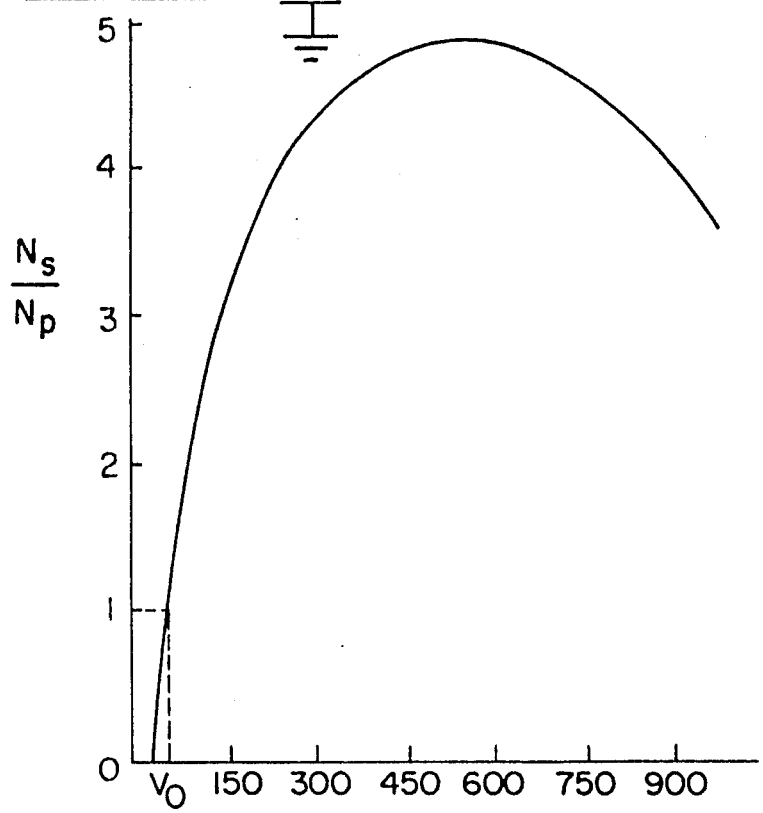

A typical primary electron to secondary-emission characteristic of an orthicon target is illustrated in FIG. 5.

Assume the electrons strike the target surface with energy (eV) electron volts, where V is the potential through which electrons have accelerated from the rest: let $N_p$ and $N_s$ be respectively the number of electrons striking the surface per unit time, and the number departing from the surface. Then at some potential $V = V_0$, the ratio $$\frac{N_s}{N_p}$$

is unity as shown by the curve in FIG. 5. As long as $V = V_0$ is maintained, the surface remains unchanged independent of the value of $N_p$. If, however, $V > V_0$, then $N_s > N_p$ and a positive charge builds up on the material, its value depending on the ratio $$\frac{N_s}{N_p}$$

as a function of V, the value of V, and the time of exposure to incoming electrons. If the curve is nearly linear in the vicinity of $V_0$, $$\frac{N_s}{N_p} \cong 1 + k(V - V_0)$$

where $$k = \frac{d}{dV}\left[\frac{N_s}{N_p}\right] V = V_0$$

It then follows that the net charge build-up $Q$ on the surface is given, for time-varying V, by $$Q(T) = eN_p k \int_0^T [V(t) - V_0] dt \quad (5)$$

where $e$ is the magnitude of the electron charge and where the system is turned on at $t = 0$. Now define $V_1 = V(t) - V_0$ and furthermore let $N_p$ become a function of time. The expression $Q(T)$ now becomes $$Q(T) = ek \int_0^T N_p(t) V_1(t) dt. \quad (6)$$

It will be seen that $Q(T)$ is of such a form that correlation techniques may be implemented; furthermore, if $N_p(t)$ also be a function of the spatial variables defining the plane of the secondary-emission surface, i.e., $$N_p \rightarrow N_p(x, y, t)$$

the two independent variables $x$, $y$ are allocated to display $N_p$ as a function of two parameters as well as time.

Figure 6:
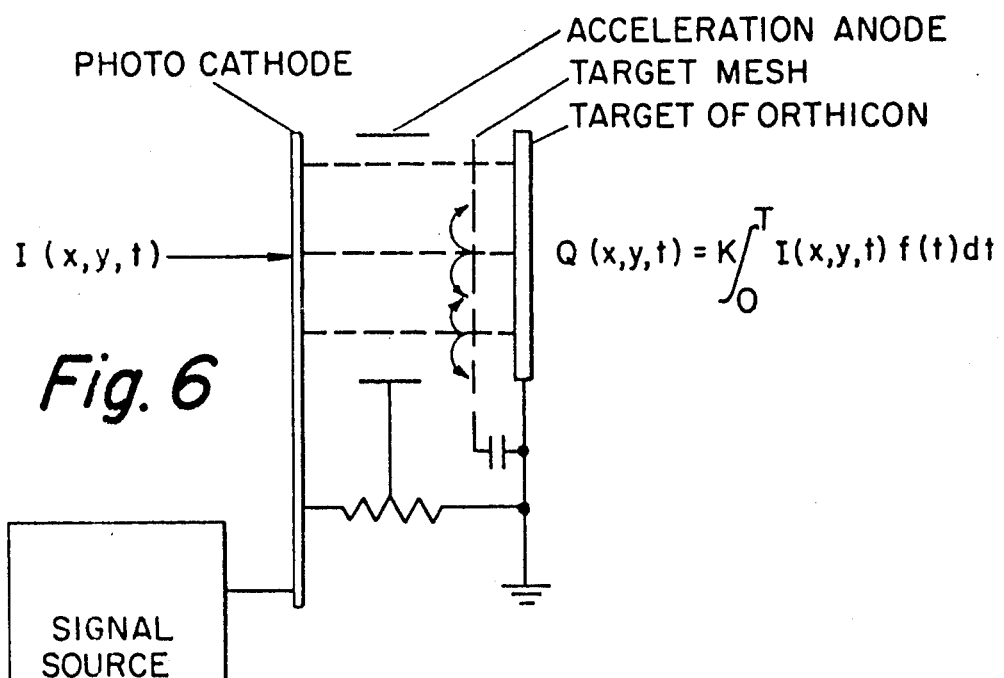
FIGS. 5 and 6 are explanatory views useful in describing the system of FIG. 4.

The imaging section of the tube can be driven in the manner illustrated in FIG. 6.

To describe how this device can be used to eliminate the bias from an incoherent hologram, consider the following example. Assume two very small light sources are focused by a lens onto the photocathode of the orthicon. Let one of these lights be excited by a battery so that it emits a steady D.C. light and the other by a source whose output voltage is the sum of a sinusoid and a bias term with value equal to the voltage where $N_s/N_p = 1(V_0)$. The intensity of the lights will be $$I_{dc} = S_b$$

$$I_{ac} = S_b + k_1 \cos(\omega t + \phi)$$

and the voltage which excites $I_{ac}$ is $$V(t) = V_0 + k_2 \cos(\omega t + \phi)$$

From equation (5), it is seen that the charge build-up at the image point of the D.C. light is $$Q(x_1, y_1, T) = eK \int_0^T S_b[V_0 + k_2 \cos(\omega t + \phi) - V_0] dt$$

$$= eKS_b k_2 \int_0^T \cos(\omega t + \phi) dt = 0.$$

This must be true since the average value of the cosine function is zero. The charge build-up will always be zero (or very small) if the time fluctuation of the light intensity is not correlated with the voltage fluctuation impressed on the accelerator grid.

However, the result is different at the image point of the fluctuating light. Here $$Q(x_2, y_2, T) = eK \int_0^T \{S_b + k_1 \cos[\omega t + \phi]\}$$

$$\{V_0 + k_2 \cos(\omega t + \phi) - V_0\} dt$$

$$= eK \int_0^T [S_b k_2 \cos(\omega t + \phi)$$

$$+ k_1 k_2 \cos^2(\omega t + \phi)] dt$$

$$= eKk_1 k_2 \int_0^T \cos^2[\omega t + \phi] dt = \frac{eKk_1 k_2 T}{2}.$$

It will be seen that Q continues to build up as the length of time T is increased, since the light source fluctuation is correlated with the accelerator grid voltage. The value of Q, at the point where the fluctuating light was focused, is an estimate of the amplitude of the fluctuating portion of the light.

Another important conclusion is that the bias level, in the function $N_p(x, y, t)$ has no effect on the charge build-up (the bias is suppressed) if the accelerator voltage has a zero average value, or if its average value is adjusted to be equal to $V_0$. This is an important feature of the device since it is exactly what is desired to eliminate the bias in the incoherent hologram.

Now suppose $I(x, y, t)$ is a function of the form $$I(x, y, t) = I_{dc} + f_1(x, y) \cos pt + f_2(x, y) g(t)$$

This is the form which is produced at the hologram plane of an incoherent hologram device when the light in one leg of the interferometer is vibrated at a frequency $p/2\pi$. Suppose further, that the electrical signal $$V_0 + k_1 \cos pt$$

is applied as an accelerating potential as shown in FIG. 6. Then the charge build-up is given by $$Q(x, y, T) = ekK \int_0^T [V_0 + k_1 \cos pt - V_0]$$

$$\{I_{dc} + f_1(x, y) \cos pt + f_2(x, y) g(t)\} dt$$

or $$Q(x, y, T) = ekKI_{dc} k_1 \int_0^T \cos pt \, dt + k_1 f_1(x, y)$$

$$\int_0^T \cos^2 pt \, dt + k_1 f_2(x, y) \int_0^T g(t) \cos pt \, dt$$

The first term will go to zero, for T large enough (the bias is suppressed) and the third term will also go to zero since $g(t)$ and $\cos pt$ are uncorrelated, then $$Q(x, y, T) = \frac{k_1 T}{2} f_1(x, y)$$

The charge pattern on the target is proportional to the spatially fluctuating part of the light intensity. This charge pattern can now be scanned by the readout beam of the orthicon and recorded on film with the proper bias added electrically.

With regard to FIG. 1, there has been discussed the making of incoherent holograms using an interferometer where the two legs are spatially separated. However, the cyclical type interferometer has the advantage that the two path lengths through the interferometer are automatically equal and no adjustment is required even for broad-band light. A technique for implementing the cyclical interferometer making incoherent holograms, using the foregoing time correlation techniques, will now be described.

Referring to FIG. 7, there is diagrammatically illustrated a method and apparatus for phase-modulating light in a cyclical interferometer 30 which can be used for production of incoherent holograms in accordance with the present invention. Part of the light enters the instrument or system 30 at $0_1$ and proceeds counterclockwise (ccw) to $0_2$, $0_3$, and back to $0_1$. Another part of the light also enters at $0_1$, but proceeds clockwise (cw) to $0_3$, $0_2$, and back to $0_1$, where it is recombined with the ccw portion. The distance $A + B = f_1 + f_2$ so that the two lenses are set as a telescope. Consequently, the object is imaged in the ccw direction with magnification $f_1/f_2$ at $I_1$ while in the cw direction the image is formed at $I_2$ with magnification $f_2/f_1$. These images disperse from $I_1$ to $I_2$ to form a Fresnel zone plate at the hologram plane.

As shown in FIG. 7, the interferometer 30 is modified so that the light proceeding in the ccw direction is phase-modulated. A polarizer 35 is placed between the object and the interferometer 30 so that light from the object is polarized in the vertical direction. The light proceeding in the ccw direction after passing through the beam splitter BS enters an optically active material 36, such as quartz, which rotates the plane of the polarization so that it is horizontal. The light then enters a phase-modulator 37, such as a crystal of potassium dihydrogen phosphate (KDP), which is arranged so that only light which is horizontally polarized is phase-modulated. This light then proceeds ccw around the interferometer 30 through $0_2$ and $0_3$ at the mirrors and through $0_1$ to the hologram plane.

The light proceeding in the cw direction is vertically plane polarized and is not affected by the phase-modulator 37. After passing through the modulator 37, it enters the optically active material 36 where its plane of polarization is changed to the horizontal. This cw light is reflected from the beam splitter BS and proceeds to the hologram plane where it interferes with the ccw light which also is polarized in the horizontal direction. This polarization method can, of course, be applied to other interferometers such, for example, as the closed path Mach-Zender interferometers.

It is to be understood that vibrating the mirror in the system of FIG. 1 is not the only way of obtaining phase-modulation of the light in one path. Other types of phase-modulators may be used; for example, a Pockels cell, a Kerr cell, or a rotating glass plate which has alternate segments with different optical path lengths.

While there have been described preferred embodiments of the invention, it will be understood that further modifications may be made without departing from the spirit and scope of the invention as set forth in the appended claims.

What is claimed is:

1. A method of making holograms of an object using spatially incoherent radiant energy in a hologram-making interferometer having two radiant energy paths comprising the steps of directing spatially incoherent radiant energy from the object along the two paths of the interferometer, phase-modulating the radiant energy in one path of the interferometer so as to produce a corresponding time modulation in the intensity of radiant energy at the hologram plane to reduce the bias or background noise level in the hologram to be produced, and detecting the radiant energy from both paths at the hologram plane with a detector responsive to the modulation in the radiant energy intensity.

2. A method of making holograms according to claim 1 wherein the detector is responsive to the modulation in the radiant energy intensity as well as to the position in the hologram plane.

3. A method of making holograms according to claim 2 including the step of recording the output of the detector as a hologram.

4. A method of making holograms according to claim 2 including the step of displaying the output of the detector as a hologram.

5. Apparatus for making holograms of an object using spatially incoherent radiant energy comprising:
a hologram-making interferometer having two radiant energy paths,
means for phase-modulating the radiant energy in one path of the interferometer so as to produce a corresponding time modulation in the intensity of radiant energy at the hologram plane to reduce the bias or background noise level in the hologram to be produced, and
detecting means sensitive to the corresponding modulation in the intensity of radiant energy received at the hologram plane as well as to the position in the plane.

6. Apparatus according to claim 5 including means for recording the output of said detector as a hologram.

7. Apparatus according to claim 5 including means for displaying the output of said detecting means as a hologram.

8. Apparatus according to claim 5 wherein said hologram-making interferometer includes a pair of mirrors, and said phase-modulating means comprises means for vibrating one of said interferometer mirrors.

9. Apparatus according to claim 5 wherein said hologram-making interferometer comprises:
a cyclic interferometer in which said two radiant energy paths are provided by passing the radiant energy through the same optical elements but in opposite directions through said cyclic interferometer and wherein said means for phase-modulating the radiant energy in one path comprises means for rotating the plane of polarization of the light by approximately 90° in series with means for introducing a phase-modulation, the magnitude of which depends upon the plane of polarization.

10. Apparatus according to claim 5 wherein said detecting means includes an image orthicon tube including means for operating said tube as a two-dimensional optical correlator.

11. Apparatus according to claim 5 wherein said detecting means includes photocell means.

12. Apparatus according to claim 9 wherein said means for introducing a phase-modulation comprises a crystal of potassium dihydrogen phosphate (KDP).

PO-1050
(5/69)

UNITED STATES PATENT OFFICE
CERTIFICATE OF CORRECTION

Patent No. 3,597,525          Dated August 3, 1971

Inventor(s)  Adam Kozma

It is certified that error appears in the above-identified patent and that said Letters Patent are hereby corrected as shown below:

On the first page of the patent, correct the spelling of Mackiewicz in the firm name.

Column 1, line 27, correct the spelling of interference;

line 47, delete the word "on" and insert the word --in--.

Column 4, second and third equations the small "x" above the symbol sigma should be --two small zeros--.

line 45, after the word "summed" correct the spelling of --there--.

Column 6, line 64, correct the spelling of the word --excited--.

Signed and sealed this 11th day of April 1972.

(SEAL)
Attest:

EDWARD M. FLETCHER, JR.         ROBERT GOTTSCHALK
Attesting Officer               Commissioner of Patents